April 19, 1960 D. L. BONHAM 2,933,699

FREQUENCY CONTROL MEANS FOR MONOPHONIC
TONE GENERATING OSCILLATOR
Filed Nov. 15, 1956

DON L. BONHAM,
INVENTOR.

HUEBNER, BEEHLER,
WORREL & HERZIG,
ATTORNEYS.

BY Warren T. Jessup

United States Patent Office 2,933,699

Patented Apr. 19, 1960

2,933,699

FREQUENCY CONTROL MEANS FOR MONOPHONIC TONE GENERATING OSCILLATOR

Don L. Bonham, Pacoima, Calif., assignor to Pacific Mercury Television Mfg. Corp., Sepulveda, Calif., a corporation of California Application November 15, 1956, Serial No. 622,466

12 Claims. (Cl. 331—179)

This invention relates to frequency control means for an oscillator, and particularly for a monophonic tone generating oscillator.

It is an object of this invention to provide simplified means for controlling or adjusting the frequency of an oscillator.

It is another object of this invention to provide an oscillator of adjustable frequency, particularly adapted for generating monophonically any one of a plurality of musical tones.

It is a further object of this invention to provide an improved and simplified oscillator having particular adaptability as a monophonic tone generator such as is required in the pedal clavier of an electric organ.

It is another object to provide a frequency controlled oscillator wherein the tolerances of the frequency controlling components are not critical, thereby enabling relatively inexpensive parts to be used without detriment to performance.

Figure 1:
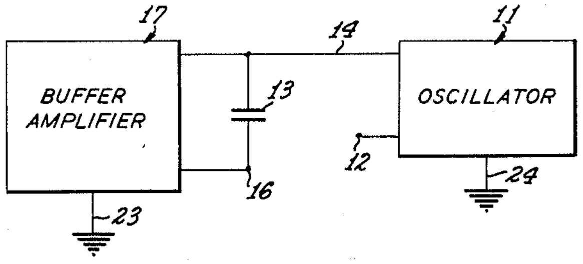
Figure 2:
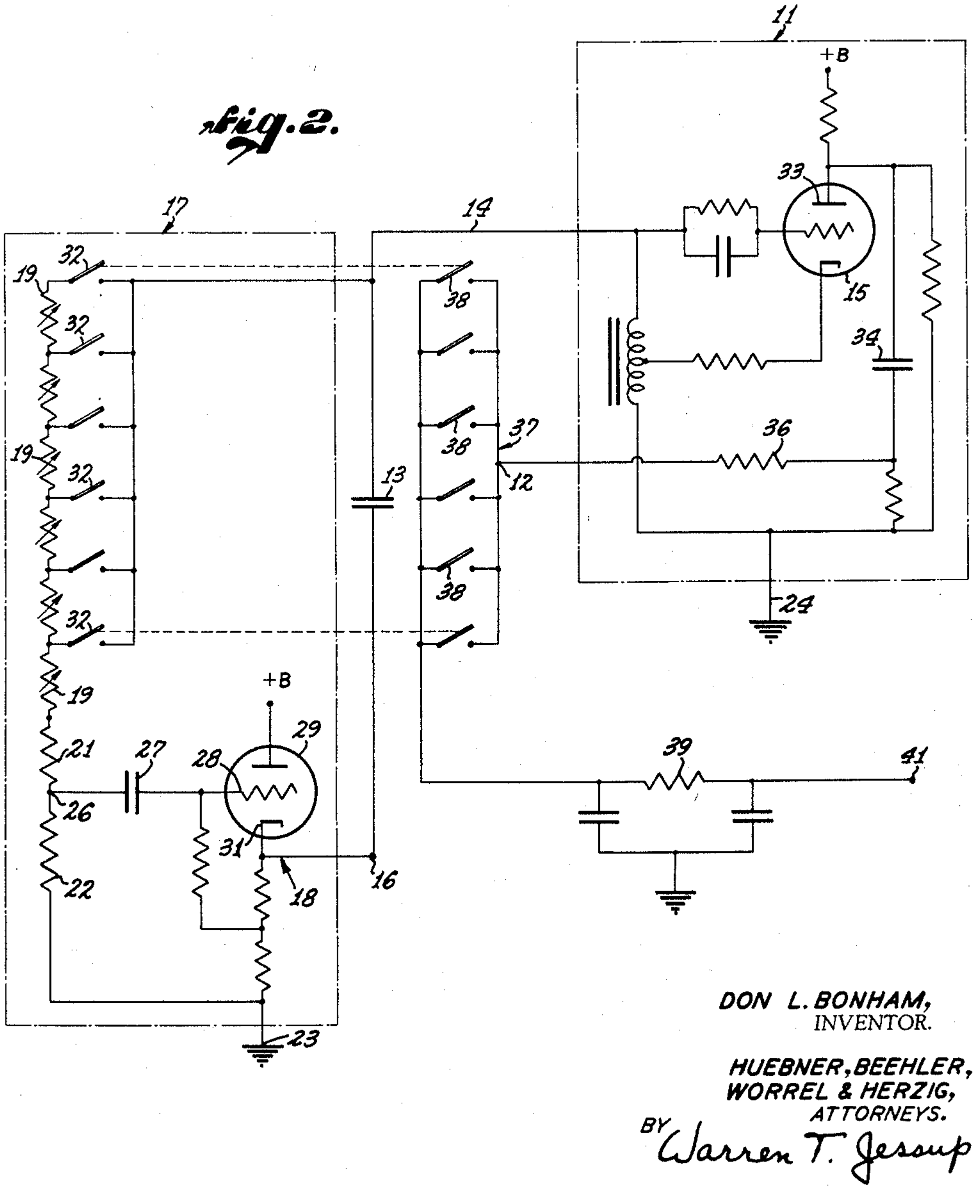

In accordance with these and other objects which will become apparent hereinafter, a preferred form of the present invention will now be described with reference to the accompanying drawing, wherein:

Figure 1 is a schematic view illustrating in block diagram form the essential components of the circuit of this invention; and Figure 2 is a circuit diagram showing preferred circuitry for the block diagram of Figure 1.

Referring to the drawing, 11 designates an oscillator having an output terminal 12 on which appears an alternating signal or voltage. Since this oscillator is particularly designed, although not limited to use, as a tone generator of frequencies in the audible range, it will be described in that connection hereinafter. The oscillator 11 includes as part of its operating circuit a frequency determining impedance, shown in this embodiment as a capacitor 13, the apparent value or magnitude of which determines the oscillation frequency of the oscillator 11. Circuit means including a lead 14 serve to connect the capacitor 13 to the grid of the tube 15 of the oscillator 11.

In accordance with this invention, means are provided for applying to the other terminal 16 of the capacitor 13 a voltage of adjustable amplitude, said voltage being synchronized with the voltage of the terminal 14. This voltage applying means in the present example takes the form of a buffer circuit 17 including as a component thereof a cathode follower 18.

When the magnitude of the voltage applied to the terminal 16 by the circuit 17 is zero, the full oscillation voltage (voltage of oscillation frequency) on the lead 14 appears across the capacitor 13 (less a negligible drop across the cathode impedance), and thus the reactance of the capacitor 13 appears to the oscillator 11 as its true reactance. In the embodiment shown, the voltage applied to 16 by the circuit 17 is in phase with the voltage at 14. As the voltage on the terminal 16 increases, a lesser and lesser oscillation voltage appears across the capacitor 13, so that less and less current passes through the capacitor 13 and the apparent reactance of the capacitor 13 increases. Thus, the oscillation frequency is caused to increase by increasing the in phase voltage at 16.

The voltage at 16 is obtained by connecting the terminal 16 to the output of the buffer circuit 17 and connecting the lead 14 to the input of the buffer 17. The buffer 17 preferably has a gain which is less than one but greater than zero. Since this is one of the characteristics of a cathode follower, it is expedient to use a cathode follower, shown at 18, as part of this circuit. The circuit 17 also includes means for applying a controllable or adjustable portion of the oscillation voltage appearing at 14 to the input of the circuit, thereby to control the magnitude of the voltage at 16.

As indicated, it is preferred to provide at 17 a circuit which has a gain between zero and one. However, the present invention may also be practised, in certain of its aspects, with a buffer circuit having a negative gain, i.e. one in which the output voltage at 16 is directly out of phase with the input voltage at 14. In this case, as the output voltage at 16 is increased, the oscillation frequency of the oscillator decreases.

Included in the circuit 17 is a voltage divider consisting of a plurality of resistors 19, 21 and 22 connected successively in series between the lead 14 and a ground point 23, which is also common to a ground point 24 in the oscillator 11. An intermediate point 26 of the voltage divider is connected, through a capacitor 27, to the grid 28 of a cathode follower tube 29. The cathode 31 of the tube 29 is connected to the output terminal 16. Switch means are provided for selectively controlling or adjusting the voltage divider, thereby to determine the percentage of the voltage at 14 which is placed on the grid 28, and thus determine the magnitude of the voltage appearing on the terminal 16.

This switch means comprises a plurality of switches 32, each having one terminal connected to the lead 14, the respective other terminals which are connected successively down the line of resistors 19. The switches 32 are operated by respective keys of a musical keyboard.

When all of the switches are in open position, as shown in Figure 2, the grid 28 is completely isolated from the terminal 14 and the cathode follower 29 passes a nominal current which is D.C. and therefore has no effect on the frequency determining characteristics of the capacitor 13. When the topmost of the switches 32 is closed, a minimum portion or percentage of the voltage appearing at 16 is applied to the grid 28; and therefore, a minimum magnitude A.C. voltage of oscillation frequency appears at the output terminal 16. This causes the capacitor 13 to appear to the oscillator a little smaller than it actually is, and hence the oscillation frequency goes up slightly. The exact value of the frequency is dependent upon the voltage division effected by the voltage dividing resistors 19, 21 and 22, which is in turn determined by the adjustment of the respective resistors 19.

When one of the lower switches 32 is closed, a predetermined portion or number of the resistors 19 is cut out of the circuit, thereby increasing the proportion of the voltage at 14 which is applied to the grid 28, with a consequent increase in the magnitude of the voltage at 16 and a consequent pre-determined increase in oscillation frequency.

The oscillator 11 is a modified Hartley, the output of which is taken from the anode 33 through a capacitor 34, resistor 36, a band 37 of parallel connected switches 38, a filter 39, to output terminal 41. Each of the switches 38 is operated simultaneously with a switch 32 by the corresponding pedal or keyboard key. The switches 38 are required because no tone from the oscillator 11 should appear at the output 41 except when one of the keys is operated or closed.

The circuit of the present invention has the advantage that it is impossible to produce a spurious tone. Even if two or more switches 32 are closed at the same or overlapping time periods, the oscillator will oscillate only at the frequency corresponding to the highest key depressed, i.e. the lowermost of the closed switches 32.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What is claimed is:

1. Frequency control means for an oscillator, comprising: a frequency controlling impedance having one terminal adapted to be connected to the oscillator, and means for applying to the other terminal of said impedance an oscillating voltage of adjustable amplitude substantially synchronous and in phase with the voltage on said one terminal, thereby to adjustably control the apparent magnitude of said impedance and thus control the oscillation frequency.

2. A frequency control means for an oscillator comprising in combination an oscillator including a frequency controlling impedance, a cathode follower, circuit means connecting one terminal of said impedance to the output of said cathode follower, circuit means connecting the other terminal of said impedance to the input of said cathode follower, the oscillations of said oscillator appearing on said other terminal, and means for adjusting the amplitude of the oscillatng voltage applied to the input of said cathode follower, thereby to adjustably control the apparent magnitude of said impedance and thus control the oscillation frequency.

3. Frequency control means for an oscillator comprising in combination: an oscillator including an impedance, the apparent value of which determines the operating frequency of said oscillator, buffer circuit means having input and output, circuit means for returning one terminal of said impedance to said output, a voltage divider connected to said oscillator for receiving thereacross the oscillations of said oscillator, and circuit means connecting said voltage divider to said input for applying to said input an adjustable percentage of said oscillation, thereby to control the apparent value of said impedance, and thus control said operating frequency.

4. Means in accordance with claim 3 wherein said buffer circuit is a cathode follower, and said impedance is a capacitor.

5. Monophonic tone generating oscillator circuit comprising a plurality of keys selectively operable to determine the frequency of oscillation; an oscillator having a frequency determining impedance therein; a cathode follower having input and output; circuit means for connecting one terminal of said impedance to said cathode follower output, said cathode follower output having thereon an oscillating voltage of the same frequency as that of said oscillator and of controllable, adjustable amplitude; a voltage divider connected to said oscillator for receiving oscillation voltage thereacross and including circuit means connecting said voltage divider to said cathode follower input; switch means operable by said keys and connected to said voltage divider for determining the portion of said oscillation voltage to be applied to said input, thereby to adjust the apparent magnitude of said impedance, and thus determine the oscillation frequency of said oscillator.

6. Frequency control means for an electronic oscillator comprising in combination: an oscillator having an electron valve and a frequency determining circuit including an impedance, the apparent value of which determines the operating frequency of said oscillator; one terminal of said impedance being connected to said oscillator so as to have the oscillations thereof appear thereon; circuit means independent of said electron valve for applying to the other terminal of said impedance an oscillating voltage of the same frequency as that of said oscillator and of controllable, adjustable amplitude; said circuit means having at least two terminals, one being connected to said one terminal of said impedance, the other being returned to said electron valve; said other terminal of said impedance being connected to a point on said circuit means intermediate said terminals of said circuit means; said point having thereon said oscillating voltage of the same frequency as that of said oscillator; and means for adjustably controlling the amplitude of said last mentioned oscillating voltage, thereby to adjustably control the apparent value of said impedance and thus control the oscillator frequency.

7. Frequency control means in accordance with claim 6 wherein said circuit means includes a buffer circuit which places only slight loading on said oscillator.

8. Frequency control means in accordance with claim 7 wherein said circuit means includes voltage dividing means for placing on said intermediate point a voltage of oscillation frequency having a predetermined, adjustably controlled ratio with respect to the oscillation voltage of the oscillator appearing on said one terminal.

9. Frequency control means for an oscillator comprising in combination an oscillator including an impedance the apparent value of which determines the operating frequency of said oscillator, one terminal of said impedance being connected directly to said oscillator and having thereon the oscillation frequency voltage of the oscillator, and means for applying to the other terminal of said impedance an oscillating voltage of adjustable amplitude substantially synchronous and in phase with the voltage on said one terminal, thereby to adjustably control the apparent magnitude of said impedance and thus control the oscillation frequency.

10. Monophonic tone generating oscillator circuit comprising: a plurality of keys selectively operable to determine oscillation frequency; an oscillator having an electron valve and a frequency determining circuit including a frequency determining impedance; circuit means independent of said electron valve and having at least two terminals, one being connected to a point on said frequency determining circuit at which voltage of oscillation frequency appears, the other terminal of said circuit means being returned to said electron valve; one terminal of said impedance being connected to a point on said circuit means having an oscillating voltage of the same frequency as that of said oscillator and of adjustable amplitude intermediate that appearing between said two terminals of said circuit means; and switch means operable by said keys for determining the amplitude of said adjustable voltage in accordance with operation of said keys, thereby to adjust the apparent magnitude of said impedance and thus determine oscillation frequency.

11. Monophonic tone generating oscillator circuit in accordance with claim 10 wherein said circuit means includes voltage proportioning means for placing on said point a voltage of oscillator frequency having an amplitude which bears an adjustably controlled ratio with respect to the oscillation voltage appearing across said pair of terminals of said circuit means, and wherein said means for adjustably controlling said amplitude includes means for adjustably controlling said ratio.

12. Monophonic tone-generating oscillator circuit comprising a plurality of keys selectively operable to determine the frequency of operation; an oscillator having a capacitor connected therein, the apparent reactance of said capacitor determining said frequency, a cathode follower having input and output, circuit means for returning one terminal of said capacitor to said output, whereby the voltage on said output determines said apparent reactance, a voltage dividing impedance connected to said oscillator for receiving thereacross a voltage of oscillation frequency, an intermediate point of said divider being connected to said input, and a plurality of switch means operable respectively by said keys and connected across portions of said divider for selectively shunting out said portions, thereby to determine the percentage of said oscillator voltage applied to said input, and thus determine said frequency.

References Cited in the file of this patent

UNITED STATES PATENTS

| | | |
|---|---|---|
| 2,077,552 | Findley | Apr. 20, 1937 |
| 2,245,354 | Mroz | June 10, 1941 |
| 2,365,566 | Langer | Dec. 19, 1944 |
| 2,539,826 | George | Jan. 30, 1951 |
| 2,565,490 | Fleming | Aug. 28, 1951 |
| 2,610,318 | Clark | Sept. 9, 1952 |
| 2,649,006 | Heytow et al. | Aug. 18, 1953 |
| 2,788,446 | Cerveny et al. | Apr. 9, 1957 |